(12) United States Patent
Avraham et al.

(10) Patent No.: US 7,464,412 B2
(45) Date of Patent: Dec. 9, 2008

(54) PROVIDING SECURE INPUT TO A SYSTEM WITH A HIGH-ASSURANCE EXECUTION ENVIRONMENT

(75) Inventors: Idan Avraham, Seattle, WA (US); Christine M. Chew, Redmond, WA (US); John E. Paff, Redmond, WA (US); Paul Roberts, Kirkland, WA (US); Hirofumi Yamamoto, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 794 days.

(21) Appl. No.: 10/693,061

(22) Filed: Oct. 24, 2003

(65) Prior Publication Data

US 2005/0091530 A1    Apr. 28, 2005

(51) Int. Cl.
  *G06F 12/14*    (2006.01)
(52) U.S. Cl. .......................................... 726/34; 726/36
(58) Field of Classification Search .................. 726/34, 726/36
  See application file for complete search history.

(56) References Cited

U.S. PATENT DOCUMENTS

| 5,590,266 | A |   | 12/1996 | Carson et al. | ............... | 395/340 |
| 5,822,435 | A |   | 10/1998 | Boebert et al. | ................ | 380/49 |
| 6,121,962 | A | * | 9/2000 | Hwang | ........................ | 345/211 |

FOREIGN PATENT DOCUMENTS

EP    0 588 083 B1    5/2003

EP    1 526 425 A2    4/2005

OTHER PUBLICATIONS

"SSH FAQ—man page of sshd". Published Nov. 8, 1995. http://www.employees.org/~satch/ssh/faq/manpages/sshd1_man.html.*
Uwe v.d. Weyden. "Nuts and Bolts of Notebooks" © Jan. 26, 2001 Tom's Hardware Guide. http://www.tomshardware.com/mobile/20010126/notebooks-01.html.*
P. Loscocco and S. Smalley. "Meeting Critical Security Objectives with Security-Enhanced Linux" Published in the Proceedings of the 2001 Ottawa Linux Symposium. http://www.nsa.gov/selinux/papers/ottawa01.pdf.*

(Continued)

*Primary Examiner*—Hosuk Song
*Assistant Examiner*—Thomas Gyorfi
(74) *Attorney, Agent, or Firm*—Woodcock Washburn LLP

(57) ABSTRACT

Techniques are disclosed to provide security for user input in which a first, host operating system is used along with a second, high assurance operating system, where the first system provides at least some of the infrastructure for the second system. Two modes are presented. In a first mode, user data is passed to the host operating system. In a second mode, user data is retained in the second operating system for the use of the second operating system or processes running on the second operating system. Transitions between the nodes can be accomplished according to hypothecated user actions such as keystroke combinations, or when the user performs an action which indicates a programmatic activation of a process running in the second operating system. Where shadow graphical elements are run by the first operating system to indicate the location of graphical elements from processes running on the second operating system, this programmatic activation may be indicated by programmatic activation of a shadow graphical element.

38 Claims, 5 Drawing Sheets

OTHER PUBLICATIONS

Garfinkel, T. et al., "Terra: A Virtue Machine-Based Platform for Trusted Computing", *ACM Symposium on Operating Systems Principles, Proceedings of the Nineteenth (19th) ACM Symposium on Operating Systems Principles*, 2003, 193-206.

Josang, A. et al., "User Interface Requirements for Authentication of Communication", *ACM International Conference Proceeding Series, Proceedings of the Fourth Australian User Interface Conference on User Interfaces 2003*, 2003, 18, 75-80.

Kent, S.T., "Encryption-Based Protection for Interactive User/Computer Communication", *Proceedings of the Fifth Symposium on Data Communications*, 1977, 5.7-5.13.

Landwehr, C.E. et al., "A Taxonomy of Computer Program Security Flaws", *ACM Computing Surveys (CSUR)*, 1994, 26(3), 211-254.

Salles, E.J. et al., "Security of Runtime Extensible Virtual Environments", *Collaborative Virtual Environments, Proceedings of the 4th International Conference on Collaborative Virtual Environments*, 2002, 97-104.

Spalka, Adrian, Cremers, Armin B., Langweg, Hanno, "Protecting the Creation of Digital Signatures with Trusted Computing Platform Technology Against Attacks by Trojan Horse Programs", *Trusted Information. The New Decade Challenge. Proceedings of IFIP/SEC'01*, 2001, 403-419.

Epstein, J. et al., "User Interface for a High Assurance Windowing System", *IEEE Computer Society, Computer Security Applications Conference*, 1993, 256-264, XP010096756.

Kilpatrick, D. et al., "Securing the X Window System with SELinux", http://www.nsa.gov/selinux/papers, Mar. 2003, 1-33, XP-002327143.

At WinHEC, Microsoft Discusses Details of Next-Generation Secure Computing Base, http://www.microsoft.com/presspass/features, 2003, 8 pages, XP-002302516.

* cited by examiner

PROVIDING SECURE INPUT TO A SYSTEM WITH A HIGH-ASSURANCE EXECUTION ENVIRONMENT

FIELD OF THE INVENTION

The present invention relates generally to the field of computer security. More particularly, the invention relates to the use of plural execution environments (e.g., operating systems) on a single computing device, and provides techniques that allow for the integrity of input to be secured in a higher-assurance execution environment from among the plural execution environments.

BACKGROUND OF THE INVENTION

In modern computing, many tasks which can be performed on a computer require some level of security. In order to provide a level of security, there are several options. One is to perform all secure applications on a computer which is completely separate from any possibly insecure elements, or to use a virtual machine monitor (VMM) to allow complete separation between two execution environments (e.g. operating systems) running on a single computer system. However, this may be impractical. There may be a need, for cost or convenience reasons, for a secure execution environment to share resources with applications with unassured security, and those applications and those resources may be vulnerable to an attacker. Additionally, where a VMM is used, since a VMM requires full virtualization of the machine and all of its devices (thereby requiring that the VMM provide its own device driver for every possible device), a VMM is not well suited to an open architecture machine in which an almost limitless variety of devices can be added to the machine.

One way to provide the ability to share resources among two execution environments is to provide a computer system in which there is one "main" operating system that controls most processes and devices on a machine, and where a second operating system also exists. This second operating system is a small, limited-purpose operating system alongside the main operating system which performs certain limited tasks. One way to make an operating system "small" or "limited-purpose" is to allow the small operating system to borrow certain infrastructure (e.g., the scheduling facility, the memory manager, the device drivers, etc.) from the "main" operating system. Since a VMM effectively isolates one operating system from another, this sharing of infrastructure is not practical using a VMM.

Certain other techniques allow operating systems to exist side-by-side on the same machine without the use of a VMM. One such technique is to have one operating system act as a "host" for the other operating system. (The operating system that the "host" is hosting is sometimes called a "guest.") In this case, the host operating system provides the guest with resources such as memory and processor time. Another such technique is the use of an "exokemel." An exokemel manages certain devices (e.g., the processor and the memory), and also manages certain types of interaction between the operating systems, although an exokernel—unlike a VMM—does not virtualize the entire machine. Even when an exokemel is used, it may be the case that one operating system (e.g., the "main" operating system) provides much of the infrastructure for the other, in which case the main operating system can still be referred to as the "host," and the smaller operating system as the "guest." Both the hosting model and the exokemel model allow useful types of interaction between operating systems that support sharing of infrastructure.

Thus, these techniques can be used to provide a computer system with at least two execution environments. One of these may be a "high-assurance" operating system, referred to herein as a "nexus." A high-assurance operating system is one that provides a certain level of assurance as to its behavior. For example, a nexus might be employed to work with secret information (e.g., cryptographic keys, etc.) that should not be divulged, by providing a curtained memory that is guaranteed not to leak information to the world outside of the nexus, and by permitting only certain certified applications to execute under the nexus and to access the curtained memory.

In a computer system with two execution environments, one of which is a nexus, it may be desirable for the nexus to be the guest operating system, and a second operating system, not subject to the same level of assurance as to behavior, to be the host operating system. This allows the nexus to be as small as possible. A small nexus allows a higher level of confidence in the assurance provided by the nexus. Therefore operating system functions be run by the host operating system.

One such operating system which may be run by the host operating system is a windowing system. When using a windowing system, a user's display will be populated with windows, areas on the screen which display information from an application. An application may have one or more windows. One window of all the windows displayed may have focus. The focus window may be indicated by a different border around the window, for example.

In traditional windowing systems, when a window has focus, it is generally the object of the user's input. Therefore, if a user types information using a keyboard, in many cases, the keystroke data will be sent by the operating system to the application which owns the window which has focus. Some keystrokes and other input actions may not be sent to the application which owns the window with focus. For example, in some windowing systems there is a keystroke command which minimizes all windows. Such a command will be handled by the windowing system, and not sent to the application owning the window with focus. The application owning the focused-on window may receive notification of the minimization of the window; however, the user keystrokes are intended for the windowing system, not the application owning the window having focus, and will not be sent to that application.

When the windowing system is run by the host operating system, rather than by the nexus, it is vulnerable to attack. This causes a problem because, as described, the windowing system tracks which window will receive user input by tracking which window has focus. Therefore an attack can be mounted on the system by shifting the focus without the user noticing, or even without indications which the user can notice.

An attack may occur, for example, via a program running on the host which switches the focus and captures keystrokes. The user is led to believe that the user's input will be directed towards a trustworthy entity—some hardware, system software, application, or window which is running in the nexus. However, at some point the focus shifts. The user input instead is being directed to the attacking program, where it is captured and may be used later.

Thus, because the windowing system is under the control of the host operating system and the user's input is generally directed to the window having focus at the time of the input, the high-assurance nature of the nexus is imperiled. Although the invention is described with reference to a windowing system, there may be other systems in which there are two or more levels of assurance, and where a user may choose which entity (e.g. an application) to interact with. In these systems, as well, certain input must be kept secure from lower-assurance applications and entities, and the same problems described above occur.

In view of the foregoing there is a need for a system that overcomes the drawbacks of the prior art.

SUMMARY OF THE INVENTION

In one embodiment of the invention, security of a secured execution environment on a system with a secured execution environment and a second execution environment, is maintained using two modes—a standard input mode and a nexus input mode. Generally, user input from the trusted input device is transferred to the second execution environment only if the secured execution environment is in a standard input mode. User input will be generally directed to processes running in the secured execution environment only when the secured execution environment is in a nexus input mode.

Decryption of user input will be done in the secured execution environment.

In one embodiment, a transfer from the standard input mode to the nexus input mode occurs on hypothecated user input or upon programmatic activation of a process running in the secure execution environment (e.g. using a mouse pointer or keyboard commands to bring a window to focus, where that window corresponds to a process running in the secure execution environment).

In one embodiment, transfer from the nexus input mode to the standard input mode occurs on hypothecated user input, or upon exiting the last process running in the secure execution environment which was displaying a graphical user interface.

In one embodiment, even in standard input mode, user input corresponding to changes to graphical user interface elements corresponding to a process running in the secure execution environment is not directed to the second execution environment.

In one embodiment security is maintained by maintaining a current state for the secured execution environment (from at least a standard input mode state and a nexus input mode state) and directing the flow of user input according to the current state.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

When two execution environments, such as operating systems, run side-by-side on a single machine, it must be determined how user input should be accessed by the operating systems. Moreover, one of the operating systems may need to be protected from accessing user input which is directed at the second operating system. The present invention provides techniques that allow user input directed at a high assurance entity on a nexus to be protected from possible discovery by host operating system entities.

Exemplary Computing Arrangement

Figure 1:
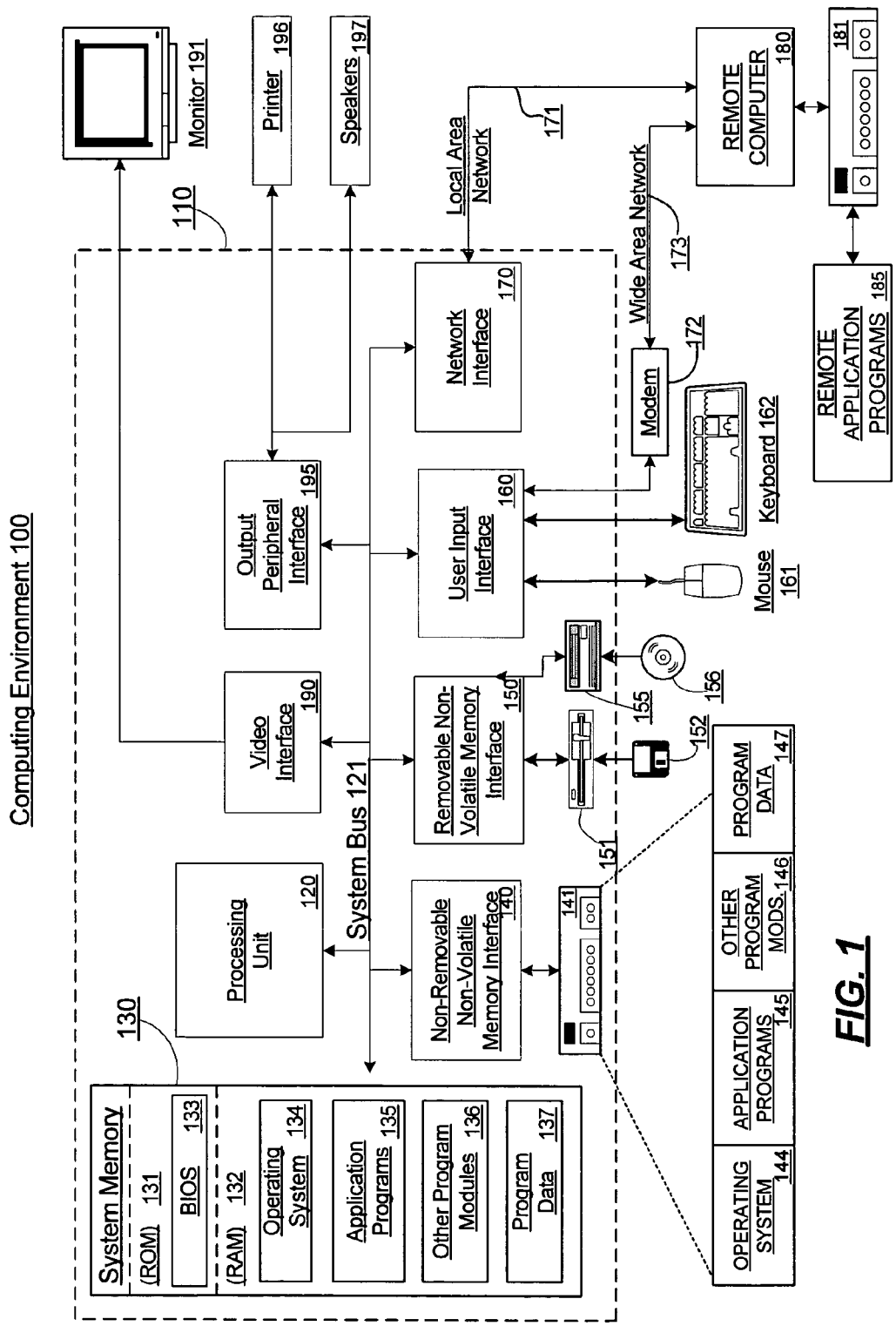
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 10, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 10, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Plural Computing Environments on a Single Machine

As previously described, it is known in the art that two operating systems can execute side-by-side on a single computing device. One problem that the present invention can be used to address is how to provided some level of separation between two operating system, while still providing for some level of interaction between the two operating systems.

Figure 2:
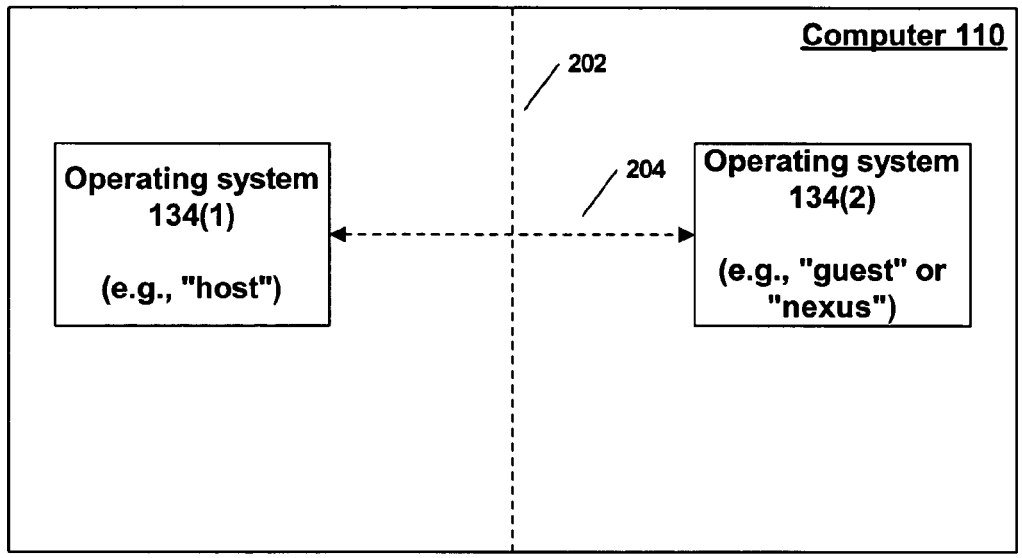
FIG. 2 is a block diagram of two exemplary execution environments that maintain some interaction with each other and some separation from each other.

FIG. 2 shows a system in which two operating systems 134(1) and 134(2) execute on a single computer 110. Some type of logical separation 202 exists between operating systems 134(1) and 134(2), such that a certain amount of interaction 204 is permitted between operating systems 134(1) and 134(2), while still allowing at least one of the operating systems to be protected against events that originate in the other operating system. In the example of FIG. 2, operating system 134(1) is a host operating system, and operating system 134(2) is a guest operating system, such as a "nexus" as described above. As previously noted, when operating system 134(2) is a nexus, it is desirable to construct separation 202 such that operating system 134(2) can interact with operating system 134(1) in order to borrow operating system 134(1)'s infrastructure, while still allowing operating system 134(2) to protect itself from actions (either malicious or innocent) that arise at operating system 134(1) and might cause operating system 134(2) to behave in a manner contrary to its behavioral specifications. (It will be understood, however, that the invention is not limited to the case where operating system 134(2) is a nexus.)

The separation 202 between operating systems 134(1) and 134(2) may, optionally, be enforced with the aid of a security monitor. A security monitor is a component external to both operating systems 134(1) and 134(2), which provides some security services that may be used to protect operating system 134(2) from operating system 134(1). For example, a security monitor may control access to certain hardware, may manage the use of memory (to give operating system 134(2) exclusive use of some portions of memory), or may facilitate the communication of data from operating system 134(1) to operating system 134(2) in a secure way. It should be noted that the use of a security monitor represents one model of how operating system 134(2) can be protected from operating system 134 (1), although the use of a security monitor is not required. As another example, operating system 134(2) could include all of the functionality necessary to protect itself from operating system 134(1).

It should be noted that FIG. 2 shows operating system 134(1) as a "host" and operating system 134(2) as a "guest." In general, this characterization refers to the fact that, in these examples, operating system 134(1) provides certain operating system infrastructure that is used by both operating systems 134(1) and 134(2) (e.g., device drivers, scheduling, etc.), and operating system 134(2) is a "guest" in the sense that it preferably lacks this infrastructure but rather uses the infrastructure of operating system 134(1). However, it should be noted that the parameters of what makes an operating system a "host" or a "guest" are flexible. Moreover, it should be noted that traditional concepts of "host" and "guest" operating systems presume that the host needs to protect itself from actions of the guest. In the example of FIGS. 2, however, guest operating system 134(2) is presumed to be a high-assurance operating system that needs to protect itself from host operating system 134(1). In the examples that follow, we shall generally refer to operating system 134(1) as the "host" and operating system 134(2) as the "guest" or "nexus" for the purpose of distinguishing between them. It should be appreciated that the techniques described herein can be applied to the interaction of any two or more operating systems running on the same machine (or even on the same set of connected machines).

User Input For Plural Computing Environments on a Single Machine

When a user interacts with programs on a computer system containing a high-assurance operating system, the user does so by means of a user input device, such as mouse 161 or keyboard 162 (from FIG. 1). As discussed above, allowing the windowing system running on host operating system 134(1) control the destination of the stream of input events may allow an attack using a compromised host operating system or application. Thus the destination of the stream of input events is controlled by a trusted user interface engine running on the nexus 134(2). Two modes are established in which the computer 110 can be operating. These two modes are standard input mode (SIM) and nexus input mode (NIM).

Details will be described below, however, generally, nexus input mode is used when user input is to be directed towards a nexus-mode process, and standard input mode is used when user input is not to be directed towards a nexus-mode process. Thus, these modes are used to provide a level of assurance that the user input will not be misdirected to an entity connected with host operating system 134(1) when it should be directed toward an entity connected with nexus 134(2). Avoiding this misdirection allows increased security for nexus-side data and processes. Because the use of the SIM and NIM modes militate against attacks on the nexus 134(2), control over these modes must be protected. Therefore, the modes are controlled by the nexus 134(2) or, where a security monitor is present in the computer system 110, it may be controlled by the security monitor.

In standard input mode, generally, user input events are unencrypted in the nexus and then passed by the nexus to a standard-mode input pipeline. This standard-mode input pipeline is the input pipeline which the host operating system 134(1) draws user input events from for its own use and for the use of applications running under the host operating system 134(1). Certain user input events, however, trigger a switch from the standard input mode to the nexus input mode. Therefore, before input events are passed to the standard-mode input pipeline, they are examined by a process running on the nexus 134(2) in order to determine whether they are events which should trigger a switch to the nexus input mode.

In addition to events which trigger a switch to the nexus input mode, some mouse or other user input events may be retained and acted on by the nexus rather than passed to the host side, even in SIM. For example, where a windowing system is being used, in standard input mode only a window owned by a non-nexus entity can have focus. In one embodiment, where a windowing system is used, the mouse is used to control the movement of a cursor over the display and the nexus controls the tracking and display movement of the mouse over windows controlled by a nexus-side application or other entity in both NIM and SIM. In such a case, where input events are mouse movements, in SIM input events which are passed to the host side from the nexus do not include mouse movements over areas with a nexus user interface element.

In the nexus input mode, user input events are processed within nexus space—that is, within the portion of computer system 110 which contains the nexus 134(2) and is separated from other portions of the computer system 110 by logical separation 202. During this mode, the standard-mode input pipeline receives no user input events. Input events are passed to the destination entities in the nexus space, or are used by the nexus 134(2) for operating system functions and also to determine whether a switch to standard input mode should occur.

In one embodiment, there are some exceptions which, even in NIM, are passed to the host 134(1). For example, commands regarding the indicator lights on a keyboard, volume control commands, and screen contrast and brightness commands may be passed to the host 134(1) in one embodiment. In an alternate embodiment, however, these commands are simply ignored when the computer system is in NIM.

Figure 3:
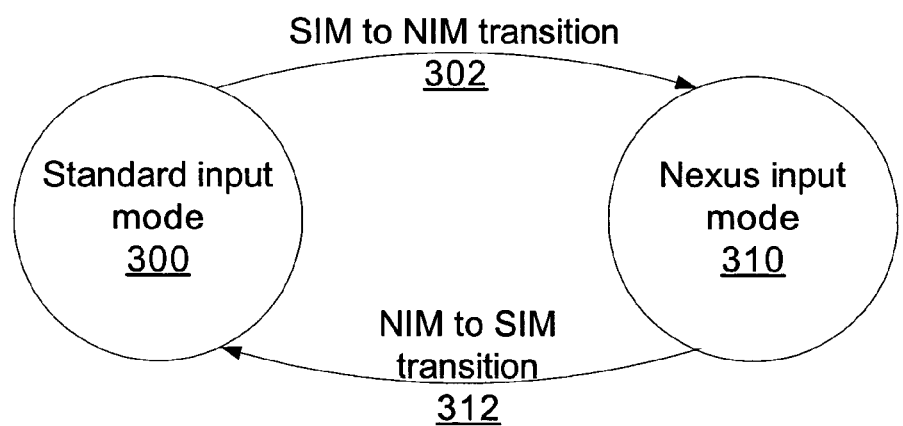
FIG. 3 is a state diagram for input modes according to one embodiment of the invention.

Thus, the input mode of the computer system 110 can be described by the state diagram shown in FIG. 3. FIG. 3 shows a state diagram for input modes according to one embodiment of the invention. The standard input mode state 300 represents the standard input mode, in which events are passed to the standard-mode input pipeline, after being examined to ensure they are not events which trigger a transition to the nexus input mode state 310. The nexus input mode state 310 represents the nexus input mode, in which the standard input mode receives no user input events.

Transitioning Between Input Modes

The SIM to NIM transition 302 occurs, in one embodiment, when a user activates a nexus user interface element. In the windowing context, this may occur when the user selects or clicks on a window which is controlled by an entity in nexus space. This indicates that the user's focus has moved to that window. In one embodiment, for each user interface element controlled by an entity in nexus space, there is a corresponding "shadow" which is maintained on the host side. When this shadow user interface element is selected (e.g. by clicking on the title bar of the shadow user interface element) a transition is made to NIM and the focus is switched to the corresponding user interface element owned by a nexus-side entity.

The SIM to NIM transition may also occur when a hypothecated user interaction occurs. A hypothecated user interaction is a user interaction which, in the context of the computer system 110, will always result in a specific consequence. Therefore, there may be a hypothecated user interaction for which the consequence is that the computer system 110 is in the nexus input mode.

Figure 4:
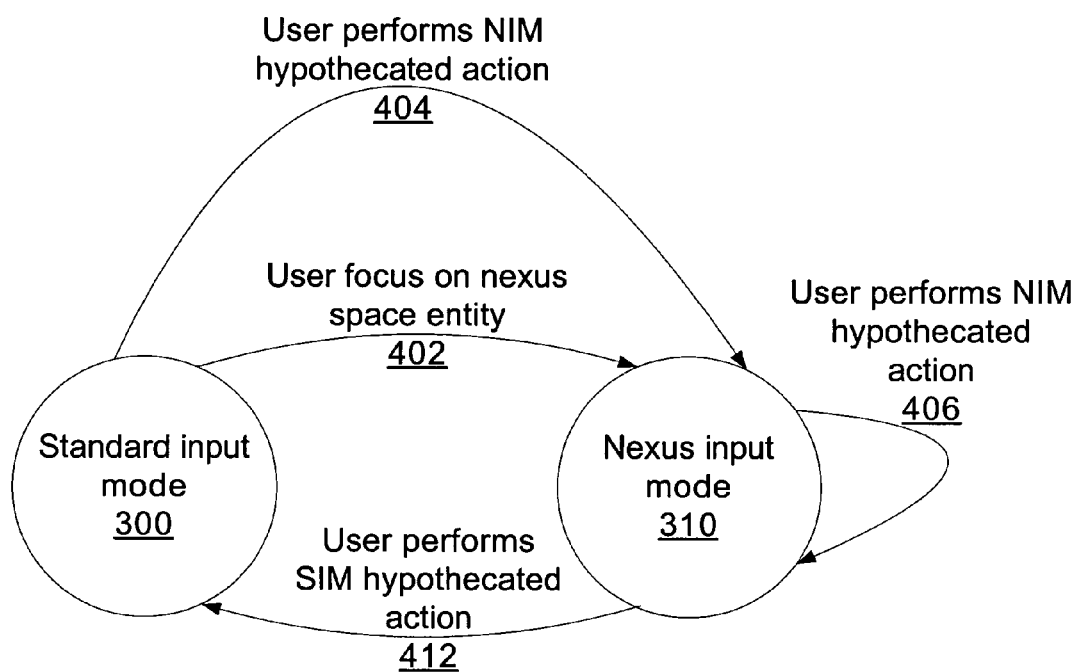
FIG. 4 is a state diagram for input modes with additional transition information, according to one embodiment of the invention.

These two ways of transitioning from SIM state 300 to NIM state 310 according to one embodiment are more fully described in FIG. 4. FIG. 4 shows a state diagram for input modes with more specific transition information, according to one embodiment of the invention. FIG. 4 shows that when the user focuses on a nexus space entity 402, the transition is made from SIM to NIM. This is one kind of hypothecated action. Additionally, when the user performs any other NIM hypothecated action 404, that is, an action which is intended to always result in the computer being in NIM state, the transition is made from SIM to NIM. It may also be the case that a user can perform a NIM hypothecated action while in NIM state 310. If so, as shown by NIM hypothecated action 406, the state remains in NIM state 310. A NIM hypothecated action may be, for example, a set or combination of keystrokes. For example, where a user presses the "control" key, the "alt" key, and the "tab" key, all at the same time, this series of keystrokes provides the guarantee that the computer system 110 will immediately switch to NIM state 310.

In one embodiment, where such a transition occurs as a result of a combination of keystrokes, the host side will receive mock-up user input data which resolves any keystroke information which it had received. Therefore, using the previous <CTRL><ALT><TAB> example, if the host side had received information that the control key and the alt key had been pressed, when the tab key is pressed, the transition to NIM state 310 occurs, and the host side receives mock-up user input which indicates that the control key and the alt key had been released. Thus, the host side input tracking is flushed or reset when the transition to NIM is made. Similarly, when a transition to SIM is made, the host side receives information about the state of the input devices, e.g. which keys are currently depressed on the keyboard, so that it can respond properly to further changes which arrive from the input devices.

With reference again to FIG. 3, a NIM to SIM transaction 312 is also provided for. In one embodiment, as shown in FIG. 4, in order to provide high assurance for nexus-space entities, this transition only occurs when the user specifically requests this switch, by performing a SIM hypothecated action 412. It can be seen that there are two ways to transition from NIM state 310 to SIM state 312, but only one way to transition back. In one embodiment, no transition exists from NIM state 310 to SIM state 312 which is "symmetrical" the transition 402 from SIM state 312 to NIM state 310 which occurs when the user focuses on a nexus space entity. More generally, with reference again to FIG. 3, in one embodiment, transitions from SIM to NIM 310 do not occur in exactly symmetrical ways to the ways in which transitions from NIM to SIM 312 occur. This is to provide increased security by assuring that a user of the computer system 110 must cause any transition to standard input mode knowingly and not accidentally.

In other embodiments, there are alternate ways to switch from SIM to NIM. For example, if a user mode process executing in the nexus (a "nexus agent") reaches a point at which it requires user input, that causes a transition from SIM to NIM. This allows some additional security. For example, if a nexus agent is displaying confidential information on the monitor 191 (from FIG. 1) it may require a password, at intervals, in order to maintain the confidential information on the monitor. If the nexus agent can force a transition to NIM and request this data, when it does not receive the password, it can remove the confidential information from the monitor 191 and perform any other actions that may be required. Another event which may trigger a transition to NIM mode is the receipt of a power management event. Such events may include powering up, powering down, switching to another form of power (battery, etc.), hibernation, etc.

In other embodiments, there are alternate ways to switch from NIM to SIM. For example, if a windowing system is being used, and the last window owned by a nexus agent is closed by the user, this times causes a transition from NIM to SIM. Because NIM is used only to allow input to nexus agents, in this embodiment, once all windows associated with any nexus agents are closed, there is no need for the computer system 110 to be in NIM, and it switches to SIM.

Path of Trusted Input In a Plural Computing Environment

In one embodiment, some or all of the user input devices such as mouse 161 or keyboard 162 (from FIG. 1) may support encryption. Such encrypted devices allow the input device and the nexus to establish a secure connection and can thus prevent a hardware attack. In one embodiment, the NIM and SIM modes apply only to input from an encrypted device. Other input devices may not be encrypted, however, input from unencrypted user input devices is only accepted for the host system, and not for the nexus or any entities running on the nexus.

Figure 5:
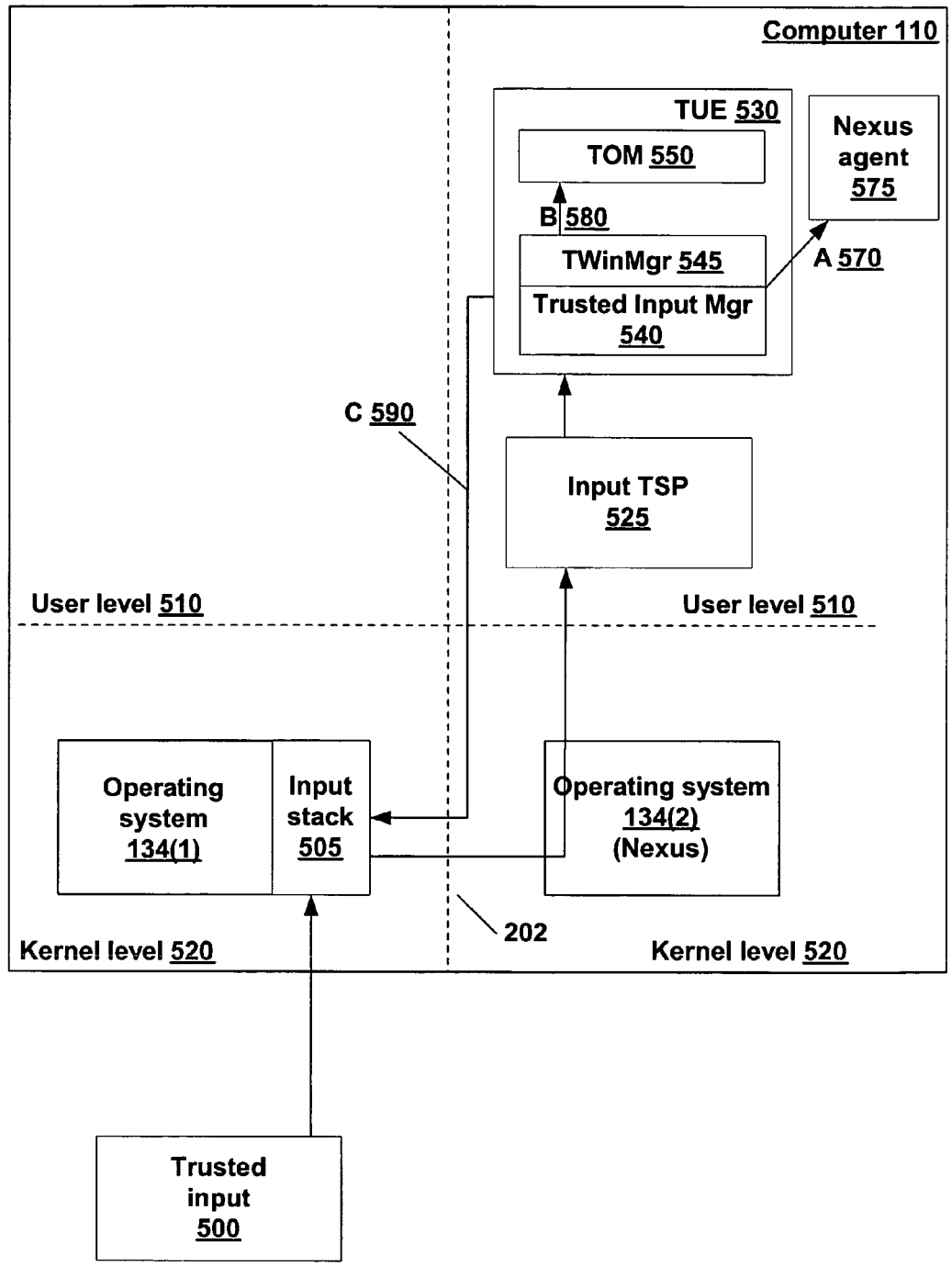
FIG. 5 is a block diagram of two exemplary execution environments that maintain some interaction with each other and some separation from each other according to one embodiment of the invention and FIG. 6 is a flow diagram of a method for maintaining the security of a secured execution environment according to one embodiment of the invention.

FIG. 5 is a block diagram of two exemplary execution environments that maintain some interaction with each other and some separation from each other according to one embodiment of the invention. As shown in FIG. 5, a trusted input device 500 sends encrypted user input data to computer system 110. The encrypted data arrives in the input stack 505 in the host-side operating system 134(1). Because it is encrypted, it can not be used by the host-side operating system 134(1) but is passed to the nexus 134(2). In FIG. 5, both the host side (to the left of logical separation 202) and the nexus side (to the right of logical separation 202) are divided further by into user level 510 and kernel level 520. These correspond to distinctions between user level and kernel level execution in operating systems. When the nexus 134(2) receives the encrypted user input data, it is passed to the input trusted service provider (TSP) 525, where the encrypted user input data is decrypted.

Decrypted data is then passed to the trusted user interface engine (TUE) 530, specifically to the trusted input manager 540. Trusted input manager 540, in conjunction with the trusted window manager (TWinMgr) 545 tracks the state of the input mode. Trusted input manager 540 and TWinMgr 545 also track whether a transition event is indicated by the user input data and changes the user input mode accordingly.

In the embodiment described above where shadow user interface elements (e.g. shadow windows) on the host side are created for each nexus-side user interface element, when a focus event is received on a shadow user interface element, notification of the event is received by TWinMgr 545, and this causes a switch to NIM. The TWinMgr 545 functions as a window manager for nexus-side user interface elements. Thus, a nexus-side window which requests focus will signal the TWinMgr 545 and cause a switch to NIM.

If the input mode is SIM, most user input data (as described above) is restored to input stack 505 for use on the host side, as shown by arrow C 590. One exception is data concerning mouse movements over nexus-side user interface elements. The display of nexus-side user interface elements is handled by the trusted output manager (TOM) 550 and so mouse movements over nexus-side user interface elements are passed to TOM 550, as shown by arrow B 580. Other exceptions include trigger events, and events as described above, which may be passed elsewhere in the nexus side.

If the input mode is NIM, the data will be passed from the trusted input manager to the correct destination nexus-mode process. This is illustrated by arrow A 570, which shows user input data being sent to nexus agent 575. Other data may be passed to other entities on the nexus side. As described above, in one embodiment some data, for example, volume control data, may be passed to the host side.

Figure 6:
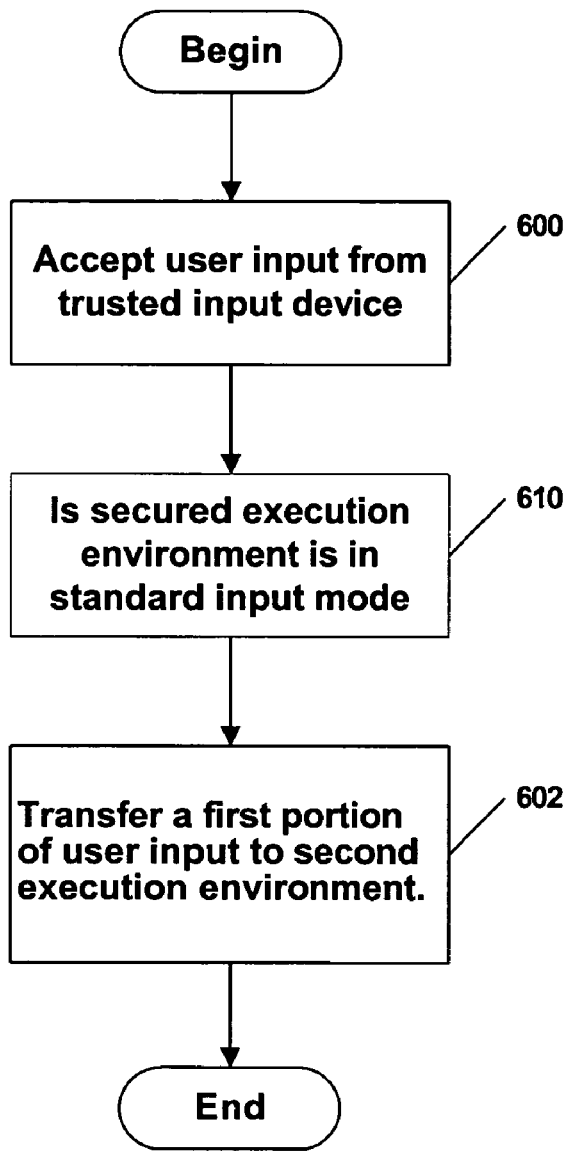

FIG. 6 is a flow diagram of a method for maintaining the security of a secured execution environment according to one embodiment of the invention. As shown in FIG. 6, in step 600, user input is accepted from a trusted input device. This may be direct, or take an indirect path, for example, the path shown in FIG. 5. In step 610, a determination is made whether the secured execution environment is in a standard input mode. If it is, step 620, at least a first portion of the user input is transferred to the second execution environment.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all fictionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for maintaining the security of a secured execution environment on a system comprising said secured execution environment and a second execution environment both on a single computing device, the method comprising:

accepting at the second execution environment a flow of user input from a trusted input device;

initially directing the accepted flow of user input from the second execution environment to the secured execution environment;

determining at the secured execution environment whether said secured execution environment is in a standard input mode;

subsequently directing the initially directed flow of user input at the secured execution environment based on the input mode of the secured execution environment including if said secured execution environment is in a standard input mode, transferring at least a first portion of said user input to said second execution environment;

determining at the secured execution environment from the initially directed flow of user input at such secured execution environment whether said user input comprises a user NIM indication that said secured execution environment should be in a nexus input mode; and if said user input comprises said user NIM indication and said secured execution environment is not in said nexus input mode, switching said secured execution environment to said nexus input mode, said user NIM indication being the only way to initiate a transition from said standard input mode to said nexus input mode, there being at least two ways to transition from said nexus input mode to said standard input mode at least one of which is not a symmetrical counterpart of said user NIM indication.

2. The method of claim 1, futher comprising:

decrypting said user input.

3. The method of claim 1, futher comprising:

if said secured execution environment is in a nexus input mode, determining a specific process running in said secured execution environment to which said user input is directed; and directing said user input to said specific process.

4. The method of claim 1, where said user NIM indication comprises a combination of keystrokes on a keyboard.

5. The method of claim 1, where said user NIM indication comprises a programmatic activation of a process running in said secured execution environment.

6. The method of claim 5, where said programmatic activation of a first process running in said secured execution environment comprises selecting a graphical user interface element corresponding to said process.

7. The method of claim 6, where said graphical user interface element is a shadow graphical user interface element displayed using a second process, where said process is running on said second execution environment, and where said shadow graphical user interface element corresponds to a secured graphical user interface element displayed by said first process.

8. The method of claim 1, further comprising:

determining whether said user input comprises a user SIM indication that said secured execution environment should be in said standard input mode; and if said user input comprises said user SIM indication and said secured execution environment is not in said standard input mode, switching said secured execution environment to said standard input mode.

9. The method of claim 8, where said user SIM indication comprises a combination of keystrokes on a keyboard.

10. The method of claim 8, where said user SIM indication comprises an action which results in a display with no graphical user interface element which corresponds to a process running on said secured execution environment.

11. The method of claim 1, where if said secured execution environment is in a standard input mode, and a second portion of said user input corresponds to changes to a graphical user interface element displayed by a process running on said secured execution environment, said changes to said graphical user interface element are performed within said secured execution environment.

12. The method of claim 11, where said changes to a graphical user interface element displayed by a process running on said secured execution environment comprise the movement of a mouse cursor over a graphical user interface element displayed by a process running on said secured execution environment.

13. The method of claim 1, further comprising:
switching said secured execution environment to a nexus input mode if a power management change is detected.

14. A computer-readable storage medium containing computer executable instructions to maintain the security of a secured execution environment on a system comprising said secured execution environment and a second execution environment both on a single computing device, the computer-executable instructions to perform acts comprising:
accepting at the second execution environment a flow of user input from a trusted input device;
initially directing the accepted flow of user input from the second execution environment to the secured execution environment;
determining at the secured execution environment whether said secured execution environment is in a standard input mode;
subsequently directing the initially directed flow of user input at the secured execution environment based on the input mode of the secured execution environment including if said secured execution environment is in a standard input mode, transferring at least a first portion of said user input to said second execution environment;
determining at the secured execution environment from the initially directed flow of user input at such secured execution environment whether said user input comprises a user NIM indication that said secured execution environment should be in a nexus input mode; and
if said user input comprises said user NIM indication and said secured execution environment is not in said nexus input mode, switching said secured execution environment to said nexus input mode, there being at least two ways to transition from said secured execution environment to said standard input mode at least one of which is not a symmetrical counterpart of said user NIM indication.

15. The computer-readable storage medium of claim 14, wherein the computer-executable instructions are adapted to perform acts further comprising:
decrypting said user input.

16. The computer-readable storage medium of claim 14, wherein the computer-executable instructions are adapted to perform acts further comprising:
if said secured execution environment is in a nexus input mode, determining a specific process running in said secured execution environment to which said user input is directed; and
directing said user input to said specific process.

17. The computer-readable storage medium of claim 14, where said user NIM indication comprises a combination of keystrokes on a keyboard.

18. The computer-readable storage medium of claim 14, where said user NIM indication comprises a programmatic activation of a process running in said secured execution environment.

19. The computer-readable storage medium of claim 18, where said programmatic activation of a first process running in said secured execution environment comprises selecting a graphical user interface element corresponding to said process.

20. The computer-readable storage medium of claim 19, where said graphical user interface element is a shadow graphical user interface element displayed using a second process, where said process is running on said second execution environment, and where said shadow graphical user interface element corresponds to a secured graphical user interface element displayed by said first process.

21. The computer-readable storage medium of claim 14, wherein the computer-executable instructions are adapted to perform acts further comprising:
determining whether said user input comprises a user SIM indication that said secured execution environment should be in said standard input mode; and
if said user input comprises said user SIM indication and said secured execution environment is not in said standard input mode, switching said secured execution environment to said standard input mode.

22. The computer-readable storage medium of claim 21, where said user SIM indication comprises a combination of keystrokes on a keyboard.

23. The computer-readable storage medium of claim 21, where said user SIM indication comprises an action which results in a display with no graphical user interface element which corresponds to a process running on said secured execution environment.

24. The computer-readable storage medium of claim 14, where a if said secured execution environment is in a standard input mode, and a second portion of said user input corresponds to changes to a graphical user interface element displayed by a process running on said secured execution environment, said changes to said graphical user interface element are performed within said secured execution environment.

25. The computer-readable storage medium of claim 24, where said changes to a graphical user interface element displayed by a process running on said secured execution environment comprise the movement of a mouse cursor over a graphical user interface element displayed by a process running on said secured execution environment.

26. The computer-readable storage medium of claim 14, wherein the computer-executable instructions are adapted to perform acts further comprising:
switching said secured execution environment to a nexus input mode if a power management change is detected.

27. A trusted user interface engine for use in a computer system comprising both a secured execution environment and a second execution environment on a single computing device, said trusted user interface engine comprising:
an input stack at the second execution environment for accepting a flow of user input from a trusted input device; and
a trusted input manager at the secured execution environment for receiving the accepted flow of user input from the input stack and determining at the secured execution environment whether said secured execution environment is in a standard input mode; and for subsequently directing at least a first portion of said user input to said second execution environment if said secured execution environment is in a standard input mode, the trusted input manager for determining at the secured execution environment from the received flow of user input at such secured execution environment whether said user input comprises a user NIM indication that said secured execution environment should be in a nexus input mode; and if said user input comprises said user NIM indication and said secured execution environment is not in said nexus input mode, switching said secured execution environment to said nexus input mode, there being at least two ways to transition from said secured execution environment to said standard input mode at least one of which is not a symmetrical counterpart of said user NIM indication.

28. The trusted user interface engine of claim 27, where said trusted input manager, if said secured execution environment is in a nexus input mode, determines a specific process running in said secured execution environment to which said user input is directed; and directs said user input to said specific process.

29. The trusted user interface engine of claim 27, where said user NIM indication comprises a combination of keystrokes on a keyboard.

30. The trusted user interface engine of claim 27, where said user NIM indication comprises a programmatic activation of a process running in said secured execution environment.

31. The trusted user interface engine of claim 30, where said programmatic activation of a first process running in said secured execution environment comprises selecting a graphical user interface element corresponding to said process.

32. The trusted user interface engine of claim 31, where said graphical user interface element is a shadow graphical user interface element displayed using a second process, where said process is running on said second execution environment, and where said shadow graphical user interface element corresponds to a secured graphical user interface element displayed by said first process.

33. The trusted user interface engine of claim 27, where said trusted input manager determines whether said user input comprises a user SIM indication that said secured execution environment should be in said standard input mode; and if said user input comprises said user SIM indication and said secured execution environment is not in said standard input mode, switches said secured execution environment to said standard input mode.

34. The trusted user interface engine of claim 33, where said user SIM indication comprises a combination of keystrokes on a keyboard.

35. The trusted user interface engine of claim 33, where said user SIM indication comprises an action which results in a display with no graphical user interface element which corresponds to a process running on said secured execution environment.

36. The trusted user interface engine of claim 27, where a if said secured execution environment is in a standard input mode, and a second portion of said user input corresponds to changes to a graphical user interface element displayed by a process running on said secured execution environment, said changes to said graphical user interface element are performed within said secured execution environment.

37. The trusted user interface engine of claim 36, where said changes to a graphical user interface element displayed by a process running on said secured execution environment comprise the movement of a mouse cursor over a graphical user interface element displayed by a process running on said secured execution environment.

38. The trusted user interface engine of claim 27, where said trusted input manager switches said secured execution environment to a nexus input mode if a power management change is detected.

* * * * *